Nov. 21, 1939.  C. R. MASON  2,180,990
PROTECTION OF ALTERNATING CURRENT SYSTEMS
Filed Sept. 17, 1938
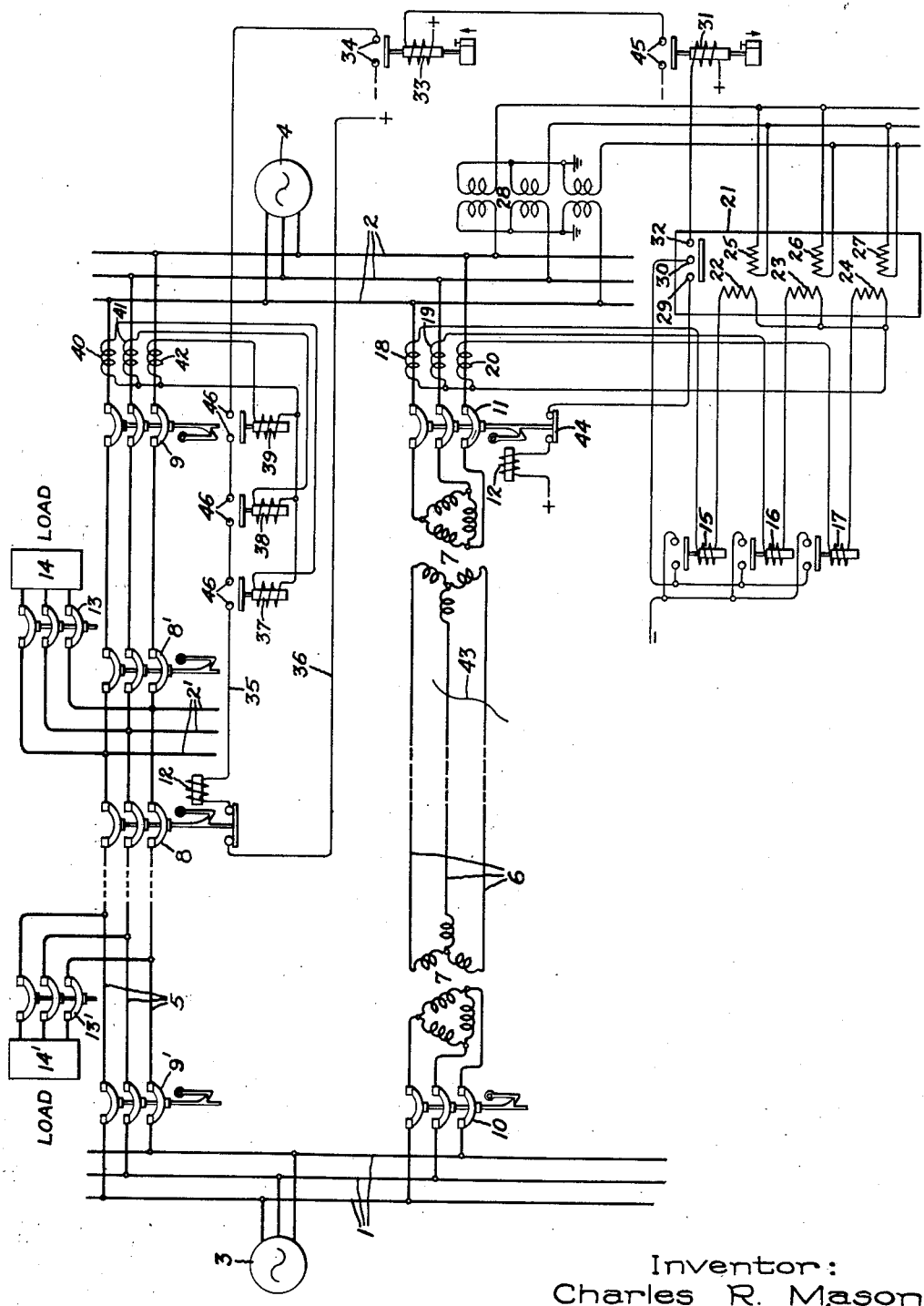
Inventor:
Charles R. Mason,
by Harry E. Dunham
His Attorney.

Patented Nov. 21, 1939

2,180,990

UNITED STATES PATENT OFFICE

2,180,990

PROTECTION OF ALTERNATING CURRENT SYSTEMS

Charles R. Mason, Schenectady, N. Y., assignor to General Electric Company, a corporation of New York Application September 17, 1938, Serial No. 230,460

7 Claims. (Cl. 175—294)

My invention relates to improvements in the protection of alternating current systems and more particularly to improvements in protective arrangements for alternating current power systems wherein faults in one zone are likely to produce asynchronous conditions in another zone and thereby cause disturbances to or render unsatisfactory the service to such other zone.

There occur in alternating current power systems arrangements wherein two sources are connected by at least two lines, both of which together constitute a stronger tie than either one alone. Moreover, one of these ties may carry important loads. If the power limit of this tie is such that asynchronous conditions are likely to follow disconnection of the other tie on the occurrence of a fault thereon, then disruption of service to the important loads results when such out-of-step conditions appear, due to promiscuous opening of circuit breakers by protective relays responding to such conditions. Moreover the low voltage accompanying out-of-step conditions aggravates the situation by causing the falling out-of-step of connected apparatus and slowing down of induction motors.

In order to avoid such a breakdown in the much desired continuity of service, I provide in accordance with my invention means whereby, upon the disconnection of one of the ties from one source, to trip only such circuit breaker or breakers in the other tie as will minimize the probability of loss of service to any load. Further, in accordance with my invention, I provide means whereby this tripping of breakers in the other tie may follow immediately upon the disconnection of the one tie or only after it is apparent that asynchronous conditions are about to occur on the other tie if both sources are allowed to remain connected in parallel through this other tie. These and other objects of my invention will hereinafter appear in more detail.

My invention will be better understood from the following description when considered in connection with the accompanying drawing, and its scope will be pointed out in the appended claims.

In the single figure of the accompanying drawing which diagrammatically illustrates an embodiment of my invention, two station high voltage busses 1 and 2, which are shown as supplied with alternating current at a desired voltage by sources 3 and 4 respectively, are connected by at least two tie lines 5 and 6. As shown, one of these lines may operate at a different voltage than the other. Thus, through the medium of suitable transformers 7, the tie line 6 may operate at a higher or lower voltage than the tie line 5. While I have shown the tie line 6 as only one section in length, it will be understood that either or both tie lines may comprise one or more sections with intermediate stations. Thus, for example, the tie line 5 may include an intermediate station indicated by the polyphase bus 2'. The tie lines, as is the usual practice, are provided at each bus end with suitable circuit interrupting means illustrated simply as latched closed circuit breakers 8, 8', 9, 9', 10 and 11 of which two, that is 8 and 11, are shown for the purpose of illustrating my invention as having trip coils 12 although it will be understood that the other circuit breakers will in general be similarly equipped. Carried by the tie line 5 and connected thereto by suitable circuit interrupting means, such as the circuit breakers 13 and 13', are loads 14 and 14' respectively. The load 14 may be supplied from the station bus 2' and the load 14' connected directly to the line 5 as shown. The loads may constitute highly important loads to which continuity of service is paramount. In fact, each may represent a whole city network or a highly concentrated industrial load.

For tie line faults, the circuit breakers 8, 8', 9, 9', 10 and 11 will, in general, be controlled by suitable fault responsive means, examples of which are well known to the art. The load circuit breakers 13 and 13' may also be provided with suitable fault responsive means, as is well known to the art. However, for the purpose of illustrating my invention, I have shown fault responsive means for controlling only one of the circuit breakers of the tie line 6, such as 11. The tie line 5, to which the loads 14 and 14' are connected, will be assumed to have a power limit such that upon disconnection of the tie line 6, as by the opening of the circuit breaker 11, asynchronism between the sources 3 and 4 is very apt to occur with an attendant interruption in continuity of service to the connected loads.

The fault responsive means for effecting the opening of the circuit breaker 11 on the occurrence of faults on the tie line 6 is illustrated simply as of the overcurrent fault detector power directional type although it will be obvious that any other suitable fault responsive means may be employed as far as my invention is concerned. The fault detectors are illustrated as simple overcurrent relays 15, 16 and 17 which have their windings connected to be energized by current transformers 18, 19 and 20 respectively in the phase conductors of the tie line 6. As is well known to the art, the fault detectors may be simple undervoltage relays or they may be relays of the so-called distance type in which response is dependent upon both current and voltage so as to insure better fault discrimination during both heavy and light load conditions without any necessity for changing the relay settings.

The power directional relay 21 is illustrated as of the polyphase type having current windings 22, 23 and 24 respectively connected to be energized from the current transformers 18, 19 and 20 and potential windings 25, 26 and 27 respectively connected to be energized in accordance with voltages in quadrature with the line currents through a suitable potential transformer 28 connected to be energized from the bus 2. For energizing the circuit of the trip coil 12 of the circuit breaker 11, the contacts of the fault detectors 15, 16 and 17 are connected in parallel with each other and in series with the contacts 29 and 30 of the power directional relay 21. As shown, the overcurrent power directional fault responsive means is responsive to faults between phases. For ground fault protection, the fault responsive means may further include a ground fault detector and ground fault power directional relay, examples of which are well known to the art.

For the purpose of illustrating my invention, it will be assumed that in the event that a fault occurs on the tie line 6 that the source 4 is the preferred source for feeding the load 14 and that the source 3 alone is capable of handling the load 14' when there is any likelihood or certainty of asynchronism between the sources 3 and 4 because of their interconnection only through the tie line 5 to which the load is connected. Thus, in accordance with my invention, I arrange, upon the opening of the circuit breaker 11 in response to faults on the tie line 6, to effect the opening of the circuit breaker 8 so as to separate the sources 3 and 4. As illustrated, this means comprises an instantaneous-closing time-delay opening relay 31 whose winding is connected in series with the parallel connected contacts of the fault detectors 15, 16 and 17 and the contacts 30, 32 of the power directional relay 21. This auxiliary relay may in turn control a circuit to effect the energization of the trip coil 12 of the circuit breaker 8 through a time delay closing auxiliary relay 33 which, as shown, closes contacts 34 in a pilot circuit comprising conductors 35 and 36. As it is possible that, under certain load conditions or otherwise, asynchronism between the sources 3 and 4 may not occur when the tie line 6 is disconnected, then in accordance with my invention I may include, in the control circuit of the trip coil 12 of the circuit breaker 8 in series, the contacts 46 of relays 37, 38 and 39 which will operate simultaneously when abnormal conditions affect all phases, and thus indicate probable asynchronism. As illustrated, these relays are shown as simple overcurrent relays which are connected to be energized from current transformers 40, 41 and 42 in the phase conductors of the tie line 5 at station 2. As is well known to the art, these relays may be undervoltage relays or relays of the overcurrent-undervoltage impedance type or distance type relays of the power directional voltage restrained type, such as disclosed, for example, in United States Letters Patent 1,883,839, issued October 18, 1932. With the impedance or distance type of fault detector, sensitivity of setting is independent of the load.

If there is little or no probability of maintaining synchronism after the disconnection of the tie line 6 from the bus 2, then the relays 37, 38 and 39 and also the auxiliary relays 31 and 33 may be omitted and the tripping of the circuit breaker 11 effected directly upon the response of the fault responsive means which controls the circuit breaker 11 since there is no need in this case of awaiting any time to ascertain whether asynchronous conditions are about to occur. While I have assumed conditions such that it is desired to disconnect the tie line 5 at a point remote from the preferred source 4, it is possible that the source 3 might be the preferred source in which event some other circuit breaker might be arranged for tripping. However, where there are two or more loads 14, 14' connected at different points of the tie line 5, it is desirable to maintain service to all loads if possible. Consequently it is often preferable to trip an intermediate circuit breaker such as 8 instead of an end circuit breaker such as 9' or 9. Also, although I have shown a pilot circuit for the control of the circuit breaker 8, it will be obvious to those skilled in the art that this remote control transfer trip could be effected by the use of any transmitted auxiliary current, as carrier current or radio transmission, by suitable arrangements, examples of which are well known to the art.

Assuming the parts positioned as shown in the drawing and that a phase fault occurs on the tie line 6, as indicated by the wavy line 43, then one or both of the fault detectors 16, 17 and the power directional relay 21 will operate whereby to complete the circuit of the trip coil 12 through the $a$ auxiliary switch 44 of the circuit breaker 11. Also, through the series connected contacts of the operated fault detector and the power directional relay 21, the auxiliary relay 31 will be energized to close its contacts 45 immediately in the circuit of the time delay closing auxiliary relay 33. This relay will close its contacts 34 after a time sufficient to avoid tripping of the circuit breaker 8 merely in response to a three-phase fault on the line 6 which would cause the simultaneous operation of the relays 37, 38 and 39. But when the auxiliary relay 31 is deenergized by the opening of the contacts of the relays 15, 16 or 17, and 21 upon the removal of the fault on the tie-line 6, the closed contacts 45 of the instantaneous closing time delay opening relay 31 will delay the deenergization of the relay 33 long enough to insure tripping of the circuit breaker 8 if the line 5 is asynchronous as indicated by the simultaneous operation of the relays 37, 38 and 39. Under such conditions the relays 37, 38, and 39 will close their serially related contacts 46 in series with the contacts 34 of the auxiliary relay 33 whereby to complete the pilot energizing circuit of the trip coil 12 of the circuit breaker 8 and thus effect the opening thereof.

It will be apparent to those skilled in the art that, if any fault responsive means, provided to control the branch circuit breakers 13 and 13' to the loads 14 and 14', is likely to respond to asynchronous conditions, which is very apt to be the case, then it is important in order to avoid disconnection of the loads and the consequent complete interruption of service thereto that the circuit breaker 8 should be opened quickly enough to prevent this possibility. Thus in such cases or whenever a quick interruption of the circuit breaker 8 is required, it is not necessary that the auxiliary relay 33 embody any time delay action in the closing as this is merely employed as a feeler in those cases where it is not certain that asynchronism is bound to occur every time one of the tie lines is disconnected.

While I have shown and described my invention in considerable detail, I do not desire to be limited to such exact arrangements but seek to cover in the appended claims all those modifications that fall within the true spirit and scope of my invention.

What I claim as new and desire to secure by Letters Patent of the United States, is:

1. In an electric system comprising two sources of alternating current interconnected by at least two tie lines and a load supplied from one of said tie lines, means for effecting a circuit interruption in the other tie line on the occurrence of a fault thereon including fault responsive means energized from said other tie line, and means controlled by said fault responsive means for effecting the electrical separation of said sources at a predetermined point in said one tie line.

2. In an electric system comprising two sources of alternating current interconnected by at least two tie lines and a load supplied from one of said tie lines, means for effecting a circuit interruption in the other tie line on the occurrence of a fault thereon including fault responsive means energized from said other tie line, and means for subsequently effecting the electrical separation of said sources at a predetermined point in said one tie line on the occurrence of abnormal conditions similarly affecting all phases of said one tie line including means controlled by said fault responsive means.

3. In an electric system comprising two sources of alternating current interconnected by at least two tie lines and a load supplied from one of said tie lines, means for effecting a circuit interruption of the other tie line on the occurrence of a fault thereon including fault responsive means energized from said other tie line, and means for effecting a predetermined time after the occurrence of the fault on said other tie line the disconnection of one of said sources from said one tie line on the occurrence of abnormal conditions similarly affecting all phases of said one tie line including means controlled by said fault responsive means.

4. In an electric system comprising two sources of alternating current interconnected by at least two tie lines and a load supplied from one of said tie lines, one of said sources constituting a preferred source for supplying said load in the event that abnormal conditions tending to asynchronism appear on said one tie line in consequence of a fault on the other tie line requiring the interruption thereof, means for effecting a disconnection of said other tie line from said preferred source on the occurrence of a fault on said other tie line including fault responsive means energized therefrom, and means for effecting a predetermined time after the occurrence of the fault on the other tie line the disconnection of said one tie line from the other of said sources on the occurrence of abnormal conditions similarly affecting all phases of said one tie line including means controlled by said fault responsive means.

5. In an electric system comprising two sources of alternating current interconnected by two tie lines and a load supplied from one of said tie lines, one of said sources constituting a preferred source for supplying said load in the event that abnormal conditions tending to asynchronism appear on said one tie line in consequence of a fault on the other tie line requiring the interruption thereof, means for effecting a disconnection of said other tie line from said preferred source on the occurrence of a fault on said other tie line including fault responsive means energized therefrom, and means controlled by said fault responsive means for effecting the disconnection of said one tie line from the other of said sources.

6. A protective arrangement for two parallel tie lines interconnecting different sources of alternating current and having a load connected to one of the tie lines intermediate its ends, comprising means responsive to a fault on the other of said tie lines for interrupting said other tie line and also said one of said tie lines at a point intermediate said load and a predetermined one of said sources.

7. A protective arrangement for two parallel tie lines interconnecting different sources of alternating current and having a load connected to one of the tie lines intermediate its ends, comprising means responsive to a fault on the other of said tie lines for interrupting said other tie line, and means for effecting an interruption of said one of said tie lines at a predetermined point intermediate said load and a predetermined one of said sources on the occurrence of predetermined asynchronous conditions on said one of said tie lines within a predetermined time after the occurrence of said fault on said other tie line.

CHARLES R. MASON.